US010496694B2

(12) United States Patent
Lor et al.

(10) Patent No.: US 10,496,694 B2
(45) Date of Patent: Dec. 3, 2019

(54) RATING AND ADVISING FOR SELECTION OF AUGMENTED REALITY MARKERS

(71) Applicant: Hong Kong Applied Science and Technology Research Institute Company Limited, Hong Kong (HK)

(72) Inventors: Kar-Wing Edward Lor, Hong Kong (HK); King Wai Chow, Hong Kong (HK); Laifa Fang, Hong Kong (CN)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 720 days.

(21) Appl. No.: 15/075,210

(22) Filed: Mar. 21, 2016

(65) Prior Publication Data

US 2017/0270140 A1 Sep. 21, 2017

(51) Int. Cl.
*G06F 16/583* (2019.01)
*G06T 11/00* (2006.01)
(Continued)

(52) U.S. Cl.
CPC .... *G06F 16/5838* (2019.01); *G06F 16/24578* (2019.01); *G06K 9/00671* (2013.01); *G06T 11/00* (2013.01); *G06K 9/4671* (2013.01)

(58) Field of Classification Search
USPC ........................................................ 707/730
See application file for complete search history.

(56) References Cited

U.S. PATENT DOCUMENTS 8,645,370 B2    2/2014  Yu et al.
9,324,014 B1 *  4/2016  Dixon et al.
(Continued)

FOREIGN PATENT DOCUMENTS

CN    103310099 A    9/2013
CN    105282393 A    1/2016
(Continued)

OTHER PUBLICATIONS

International Search Report of the related PCT application, dated Dec. 1, 2016.
(Continued)

*Primary Examiner* — Tony Mahmoudi
*Assistant Examiner* — Muluemebet Gurmu
(74) *Attorney, Agent, or Firm* — Spruson & Ferguson (Hong Kong) Limited

(57) ABSTRACT

For an augmented reality (AR) content creation system having a marker database, when a user requests this system to use a first sub-image of an image to update the marker database, this system computes a suitability score of the first sub-image for rating feature richness of the first sub-image and uniqueness thereof against existing markers in the marker database. When the suitability score is less than a threshold value, a second sub-image of the image having a suitability score not less than the threshold value and completely containing the first sub-image is searched. Then the second sub-image, the suitability score thereof and the suitability score of the first sub-image are substantially-immediately presented to the user for real-time suggesting the user to use the second sub-image instead of the first sub-image as a new marker in updating the marker database to increase feature richness or uniqueness of the new marker.

20 Claims, 7 Drawing Sheets

(51) Int. Cl.
    *G06F 16/2457* (2019.01)
    *G06K 9/00* (2006.01)
    *G06K 9/46* (2006.01)

(56) References Cited

U.S. PATENT DOCUMENTS

| | | |
|---|---|---|
| 2006/0170955 A1* | 8/2006 | Gormish |
| 2007/0237426 A1 | 10/2007 | Xie et al. |
| 2009/0196511 A1* | 8/2009 | Gendron et al. |
| 2011/0176724 A1 | 7/2011 | Yang et al. |
| 2012/0281922 A1* | 11/2012 | Yamada et al. ............... 382/201 |
| 2014/0267419 A1 | 9/2014 | Ballard et al. |
| 2015/0109337 A1* | 4/2015 | Hofmann et al. |
| 2015/0161168 A1 | 6/2015 | Covell et al. |
| 2015/0161174 A1 | 6/2015 | Kumar et al. |
| 2015/0213325 A1* | 7/2015 | Krishnamoorthi et al. |
| 2015/0227796 A1 | 8/2015 | Holzschneider et al. |

FOREIGN PATENT DOCUMENTS

| | | |
|---|---|---|
| WO | 2013044983 A1 | 4/2013 |
| WO | 2015065854 A1 | 5/2015 |

OTHER PUBLICATIONS

The first office action of a corresponding Chinese patent application (No. 201680000108.8) dated Aug. 14, 2018, including a search report on pp. 4-5 of the office action.

* cited by examiner

× Anchor —✓— 332
▧ 1st bounding rectangle —✓— 310
▨ 2nd bounding rectangle —✓— 322

× Anchor —✓— 333
▧ 1st bounding rectangle —✓— 310
▨ 2nd bounding rectangle —✓— 323

Mobile computing device used for implementing an AR content-creation system

RATING AND ADVISING FOR SELECTION OF AUGMENTED REALITY MARKERS

FIELD OF THE INVENTION

The present invention relates to determining whether a sub-image selected from an image and suggested by a user of an augmented reality (AR) content creation system is suitable for use as a marker in an AR client application, and advising the user a more suitable sub-image in case the user-suggested sub-image is not suitable.

BACKGROUND

AR is a live view of a physical scene augmented with computer-generated virtual objects such as texts, graphics, sound, etc. Currently, most AR client applications use live video images. An AR client application processes a video image digitally to add one or more virtual objects thereto. In processing the image, the AR client application matches the image content with reference images stored in the system. This process is generally referred to as image recognition. If a portion of the image is recognized to be a particular reference image, then the one or more virtual objects associated with this reference image are augmented to the image. A reference image is also known as a marker. A marker database in the AR client application is dedicated to store markers. The markers in the marker database are introduced or suggested by AR-content creators or editors. An AR-content creator usually selects a portion of the image, i.e. a sub-image of the image, and requests an AR content creation system to use the sub-image as a marker. As the marker is to be used in image recognition, it is advantageous if the suggested sub-image bears some contextual properties that enable image recognition to robustly and reliably detect this suggested sub-image in a video image under consideration and identify this sub-image unambiguously. It is desirable if the AR-content creator can determine suitability of the suggested sub-image for AR applications.

Although US2015/0161168, US2015/0161174, U.S. Pat. No. 8,645,370, US2007/0237426 and US2011/0176724 provide different ranking methods for images, these methods are not directed to AR marker creation or marker suitability ranking. US2015/0109337 provides a method for rating suitability, or "augmentability", of an image to AR. In particular, the augmentability of the image is based on light exposure of the image, the motion of the image capturing device, features in the image, and blurriness of the image. The resultant rating output is fed back to a user for indicating augmentability of the image in AR applications. Although augmentability advice is given, how to modify the image in order to enhance augmentability is not provided. As a result, the user is required to use a trial-and-error method in finding out an image suitable for AR.

There is a need in the art to have a technique for assessing suitability of a suggested image for AR marker creation as well as providing advice on modifying the suggested image to improve the suitability. Advantageously, it is preferred that the technique provides real-time feedback to a user such that identifying suitable markers for the AR marker creation becomes efficient.

SUMMARY OF THE INVENTION

The present invention is concerned with an AR content creation system comprising a marker database for storing markers, and a user device at least functioning as an interface for communicating between the AR content creation system and a user. An aspect of the present invention is to provide a method for updating the marker database with a new marker by the AR content creation system when the user selects a first sub-image of an image and requests, at the user device, the AR content creation system to use the first sub-image as the new marker.

In the method, a suitability score of the first sub-image is computed. The suitability score of any test image is used for rating feature richness of the test image and uniqueness of the test image against existing markers already stored in the marker database such that a first test image having a value of the suitability score higher than a second test image's is more suitable than the second test image to be the new marker.

When the suitability score of the first sub-image is less than a pre-determined threshold value, execute a search process to search for a second sub-image of the image under a constraint that (1) the second sub-image has a value of the suitability score not less than the pre-determined threshold value and (2) completely contains the first sub-image.

Substantially-immediately after the second sub-image is found in the search process, the second sub-image, the suitability score thereof and the suitability score of the first sub-image are presented to the user through the user device. Thereby, real-time provision of an advice to the user is achieved by suggesting the user to use the second sub-image instead of the first sub-image as the new marker in updating the marker database so as to increase feature richness or uniqueness of the new marker.

Preferably, the suitability score of any test image is computed by a computing process comprising identifying feature points of the test image and generating a signature of the test image according to the feature points. The computing process further includes determining a feature-richness score for rating feature richness of the test image and determining a uniqueness score for rating uniqueness of the test image against the existing markers already stored in the marker database. The feature-richness score is determined according to the number of the feature points. The uniqueness score is determined by comparing the signature of the test image with signatures of the existing markers. The suitability score is computed by $S_{SUI} = f(S_{FR}, \alpha) \times f(S_{UNI}, \beta)$ where: $S_{SUI}$ is the suitability score; $S_{FR}$ is the feature-richness score; $S_{UNI}$ is the uniqueness score; $\alpha$ and $\beta$, both positive, are weighting factors for $S_{FR}$ and $S_{UNI}$, respectively; and $f(S,c)$ is a monotonic increasing function of S.

The search process is preferably set out as follows. Based on a first boundary enclosing a first portion of the image where the first portion is used as the first sub-image, a candidate sub-image for consideration to be the second sub-image is generated by outwardly expanding the first boundary to give a second boundary and forming the candidate sub-image as a second portion of the image enclosed by the second boundary. The generating of the candidate sub-image is repeated until one of the following two conditions is met. First, the candidate sub-image lastly generated has a value of the suitability score not less than the pre-determined threshold value. The lastly-generated candidate sub-image becomes the second sub-image. Second, a pre-determined number of candidate sub-images have been generated but none of the candidate sub-images generated has a value of the suitability score not less than the pre-determined threshold value. Then the second sub-image is not found.

Other aspects of the present invention are disclosed as illustrated by the embodiments hereinafter.

DETAILED DESCRIPTION

Figure 1:
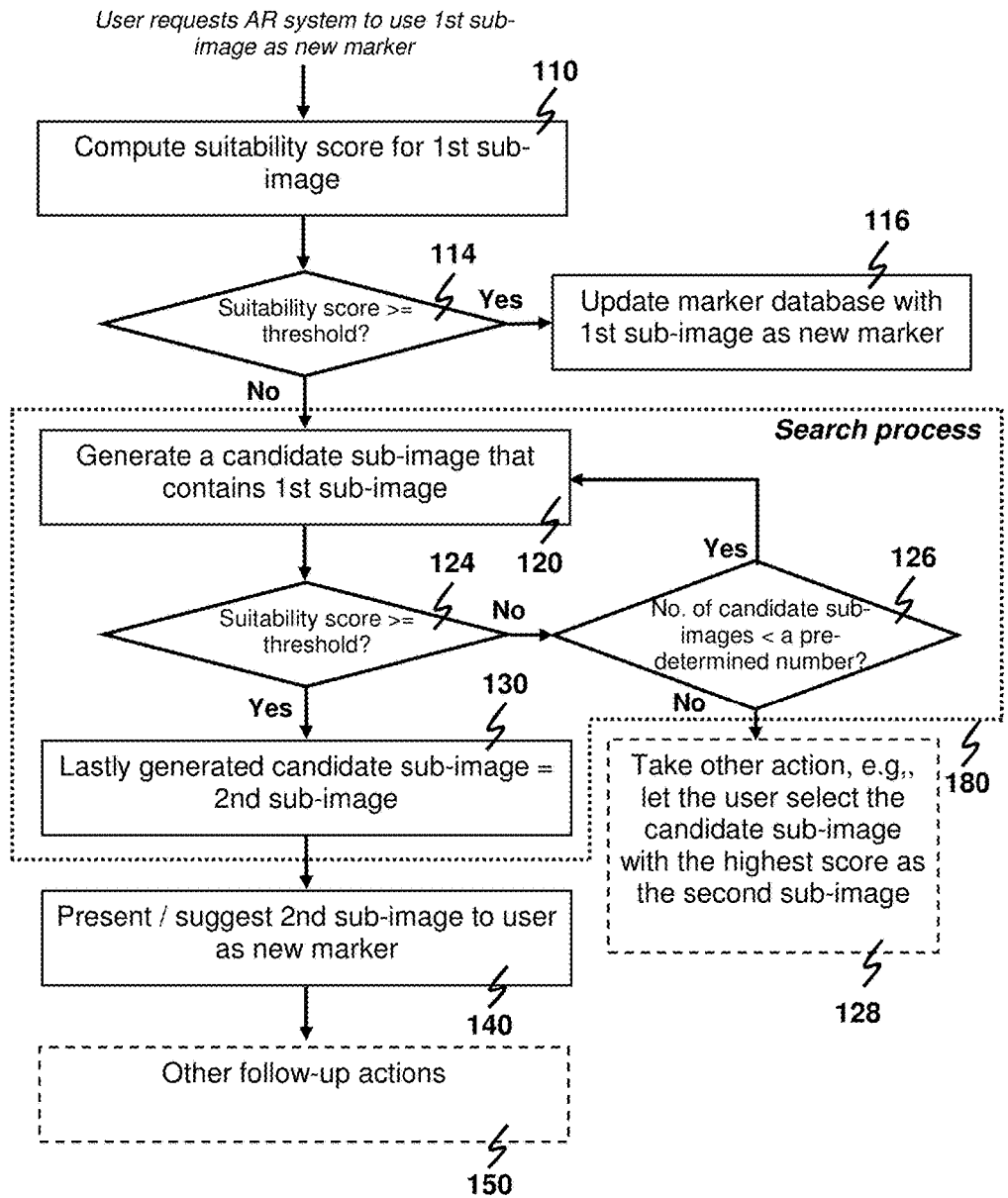
FIG. 1 depicts a flowchart of updating the marker database in accordance with an exemplary embodiment of the present invention.

The following definitions are used herein in the specification and the appended claims. "An AR-content creator" is a person who selects markers from video images, where the markers are intended to be used by an AR client application in image recognition. When the AR-content creator interacts with the AR content creation system such as inputting the markers into the system, the AR-content creator is a user of the AR content creation system. "A marker database" is a database for storing markers. As the marker database is primarily used for image recognition, the contents of the marker database are any data that can help identify the markers in image recognition. Furthermore, each marker is associated with one or more virtual objects for augmentation with a video image when the individual marker is identified in this video image. Therefore, "a marker database for storing markers" hereby means a database containing (1) any data that can help identify the markers in image recognition, such as features, signatures, fingerprints, entire images, of the markers, or a combination thereof, and (2) optionally one or more virtual objects for each of the markers, or a pointer to another database containing the one or more virtual objects. Selecting which kinds of data to be stored in the marker database for the markers is determined by those skilled in the art according to actual situations. "A user device" in an AR content creation system is a device at least functioning as an interface between the AR content creation system and a user thereof. The user device in most practical cases is realized by including one or more processors for performing computing and control functions, a display for displaying visual information to the user, and an input device for receiving inputs from the user. Examples of a user device include an Internet-enabled desktop computer and a smartphone. "A mobile computing device" is a portable electronic device having computing power and configured to provide wireless communications. For example, a mobile computing device may be a smartphone or a hand-held tablet computer. "A cloud" is construed and interpreted in the sense of cloud computing or, synonymously, distributed computing over a network unless otherwise specified. "A server" is interpreted in the sense of computing. A server is generally equipped with one or more processors for executing program instructions, and one or more storages for storing data. A server may be a standalone computing server, or a distributed server in the cloud. "A sub-image" of an image is a selected portion of the image. The sub-image is bounded by an (imaginary) boundary on the image where the boundary encloses the selected portion of the image.

An AR content creation system under consideration at least comprises a marker database for storing markers, and a user device at least functioning as an interface for communicating between the AR content creation system and a user.

An aspect of the present invention is to provide a method for updating the marker database with a new marker by the AR content creation system when the user selects a first sub-image of an image and makes a request to the AR content creation system to use the first sub-image as the new marker. The user makes the request at the user device. The first sub-image may be of any shape such as a rectangle, a polygon, a circle, or an ellipse.

Exemplarily, the method is illustrated with an aid of FIG. 1, which depicts a flowchart of updating the marker database in accordance with an exemplary embodiment of the present invention.

In the method, a suitability score of the first sub-image is computed (step 110) when the user makes the aforementioned request. The suitability score of any test image is used for rating (1) feature richness of the test image and (2) uniqueness of the test image against existing markers already stored in the marker database. Abundance of features in the test image makes image recognition of the test image less prone to error, reducing both the chance of miss and the chance of false detection in the eventual image recognition process in the AR client application. If the test image is distinctive enough (i.e. sufficiently dissimilar) from all of the existing markers, the AR client application is less confused in image recognition of the test image. In the disclosure herein, the suitability score is defined to be positively correlated with the suitability of the test image for an AR client application. It follows that a first test image having a value of the suitability score higher than a second test image's is more suitable than the second test image to be the new marker. It is apparent to those skilled in the art that equivalently, the suitability score may also be defined to be negatively correlated with the suitability. Although the disclosure herein uses the first case of defining the suitability score for illustrating the present invention, the present invention encompasses both cases.

Before the method is applied, a threshold value is determined for the AR content creation system such that a test image having a suitability score less than the threshold value is deemed to be of low quality and is not suitable for use as a marker in an AR client application. Similarly, the test image is deemed to be suitable to be a marker in the AR client application if the suitability score of the test image is greater than or equal to this pre-determined threshold value. The threshold value is determined by one skilled in the art according to an actual situation.

In a step 114, the suitability score of first sub-image is compared with the threshold value. If this suitability score is greater than or equal to the threshold value, the marker database is updated with the first sub-image as the new marker (step 116). Otherwise, a search process 180 is initiated.

The search process 180 is used to search for a second sub-image having a suitability score not less than the threshold value. As mentioned above, unsuitability is due to problems in feature richness and uniqueness, causing difficulty in image recognition. It follows that incorporating additional features that are distinctive enough to the first sub-image is a solution to the problems. If a portion of the image neighboring the first sub-image is added to the first sub-image, it is possible that the number of features in the resultant sub-image of the image is increased, leading to a resultant suitability score that is greater than the suitability score of the first sub-image. Therefore, the search process 180 is conducted under a constraint that the second sub-image completely contains the first sub-image.

One exemplary realization of the search process 180 is to perform steps 120, 124, 126 and 130. In the step 120, a candidate sub-image for consideration to be the second sub-image is generated. The generation of the candidate sub-image is based on a first boundary enclosing a first portion of the image where the first portion is used as the first sub-image. The candidate sub-image is generated by outwardly expanding the first boundary to give a second boundary and by forming the candidate sub-image as a second portion of the image enclosed by the second boundary. After the candidate sub-image is generated, the suitability sore of this candidate sub-image is computed. The step 120 is repeated until the candidate sub-image lastly generated has a value of the suitability score not less than the threshold value, or until a pre-determined number of candidate sub-images have been generated but none of the candidate sub-images generated has a value of the suitability score not less than the threshold value. The termination of repeating the step 120 is controlled by the step 124 and 126. In the step 124, the suitability score of the candidate sub-image generated in the step 120 is compared with the threshold value. If this suitability score is not less than the threshold value, the candidate sub-image lastly generated becomes the second sub-image (in the step 130). Otherwise, the number of the candidate sub-images that have been generated is checked with the aforementioned pre-determined number in the step 126. The step 120 is repeated in case the number of the candidate sub-images having been generated is still less than this pre-determined number.

If in the step 120 it is found that the pre-determined number of candidate sub-images is reached, then it is determined that the second sub-image is not found. Other appropriate action(s) as determined by those skilled in the art according to actual situations are taken (step 128). The user may use one of the images previously tested with the highest score, even though it is below the threshold, or use some other criteria to select an appropriate image. The AR content creation system may assist the user by presenting, to the user through the user device, one candidate sub-image having a highest suitability score among the candidate sub-images that have been generated.

After the second sub-image is found in the step 130, the second sub-image, the suitability score thereof and the suitability score of the first sub-image are presented to the user through the user device (step 140). An advice is also provided to the user by suggesting the user to use the second sub-image instead of the first sub-image as the new marker in updating the marker database to increase feature richness or uniqueness of the new marker. Advantageously, the presentation of the second sub-image, the suitability score thereof and the suitability score of the first sub-image is done substantially-immediately after the second sub-image is found in the search process 180. It follows that real-time provision of the advice to the user is achieved.

After the advice is provided to the user in the step 140, other follow-up actions as determined by those skilled in the art according to actual situations are proceeded (step 150). For example, the AR content creation system requests the user to approve using the second sub-image as the new marker in updating the marker database.

Figure 2:
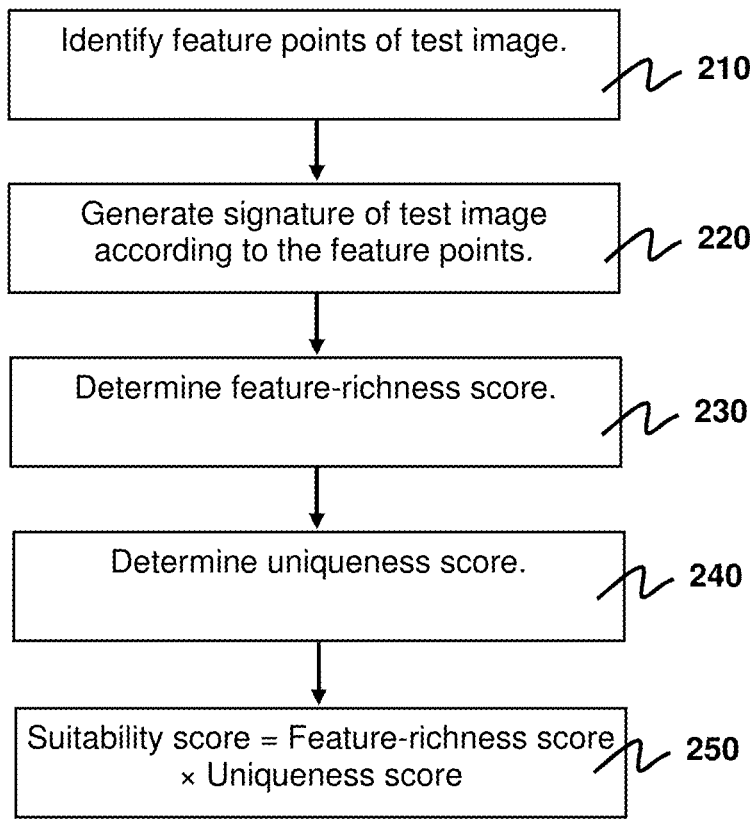
FIG. 2 depicts, in accordance with one embodiment of the present invention, a flowchart for illustrating generation of a suitability score for any test image.

FIG. 2 is a flowchart for illustrating generation of a suitability score for any test image according to one embodiment of the present invention.

In a step 210, feature points of the test image are identified. Each of the feature points is a point where the point and its neighborhood constitute distinctiveness against other points/pixel in the image. Usually, a feature point is a corner appeared in the test image. Hence, image recognition is facilitated through detection of the feature points. US2015/0213325 provides an example on a technique for identifying feature points.

In a step 220, a signature of the test image is generated according to the feature points identified in the step 210. An example of generating the signature is provided in US2015/0227796, in which a fingerprint (corresponding to a signature) is generated based on salient points of an image (corresponding to feature points).

In a step 230, a feature-richness score for rating feature richness of the test image is determined. The feature-richness score is determined according to the number of the feature points identified in the step 210. The feature-richness score is a monotonic increasing function of the number of the feature points. A greater number of the feature points yields a higher feature-richness score.

In a step 240, a uniqueness score for rating uniqueness of the test image against the existing markers already stored in the marker database is determined. The uniqueness score is determined by comparing the signature of the test image with signatures of the existing markers. If the signature of the test image is close to or similar to any of the signatures of the existing markers, the uniqueness score is low. A low uniqueness score indicates that in image recognition, the AR content creation system is easy to confuse the test image and at least one of the markers already stored in the marker database, leading to image-recognition error in performing AR.

Finally, in a step 250, the suitability score of the test image is computed by $S_{SUI} = f(S_{FR}, \alpha) \times f(S_{UNI}, \beta)$ where: $S_{SUI}$ is the suitability score; $S_{FR}$ is the feature-richness score; $S_{UNI}$ is the uniqueness score; $\alpha$ and $\beta$ are non-zero positive numbers functioning as weighting factors for $S_{FR}$ and $S_{UNI}$, respectively; and $f(S,c)$ is a monotonic increasing function of a score S. For example, the function $f$ may be $f(S,c)=S+c$ or $f(S,c)=S^c$. It follows that either one of the feature-richness score and the uniqueness score being low results in a low value of the suitability score, indicating unsuitability to be the new marker. Selection of $\alpha$ and $\beta$ is usually based on the relative importance of feature richness and uniqueness in assessing suitability of the test image as the new marker. In a special case that the feature richness and the uniqueness are treated as equally important, $\alpha=\beta$.

Figure 3A:
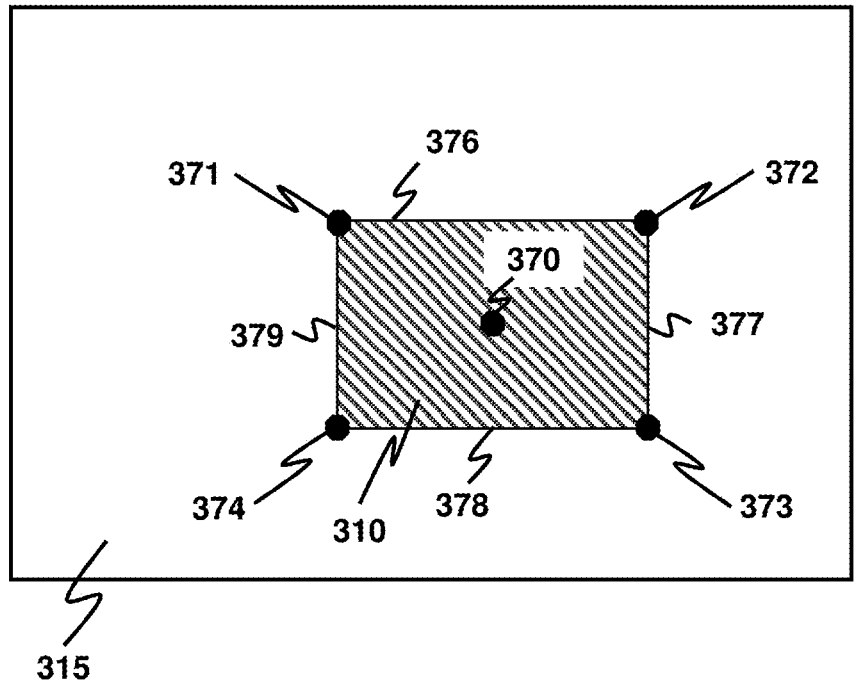
FIG. 3A depicts a first bounding rectangle for generating a second bounding rectangle defining a candidate sub-image for consideration to be selected as a second sub-image.

In one embodiment, the generation of the candidate sub-image in the step 120 is realized as follows. Regardless of the shape of the first boundary for the first sub-image, there is a bounding shape that bounds the first boundary on the image. For example, if the bounding shape is a rectangle, expanding the bounding rectangle into a bigger bounding rectangle that contains the former bounding rectangle gives a proportional expansion to the first boundary. The first boundary after this proportional expansion gives the second boundary that defines the candidate sub-image that is generated. For clarity in the description hereinafter, the aforesaid bounding rectangle is named as a first bounding rectangle, and the resultant bounding rectangle after expansion is called as a second bounding rectangle. FIG. 3A depicts a first bounding rectangle 310 used for generating a second bounding rectangle 315. The first bounding rectangle 310 has four vertices 371-374, four sides 376-379, and a center 370. A candidate sub-image is defined by a second bounding rectangle 315 expanded from the first bounding rectangle 310. The first bounding rectangle 310 is outwardly expanded to yield the second bounding rectangle 315 through one of the following geometric operations. In the geometric operations described as follows, an anchor is a point or a line which is held stationary in geometrically expanding the first bounding rectangle 310 into the second bounding rectangle 315.

Figure 3B:
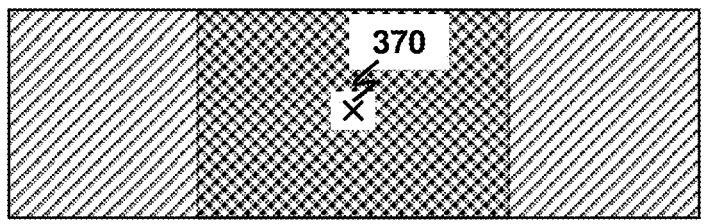
FIG. 3B illustrates, by an example, forming a second bounding rectangle by expanding a first bounding rectangle horizontally with a center thereof as an anchor.

As shown in FIG. 3B, the first bounding rectangle 310 is expanded horizontally with the center 370 as an anchor 331 of geometric operation, forming a second bounding rectangle 321.

Figure 3C:
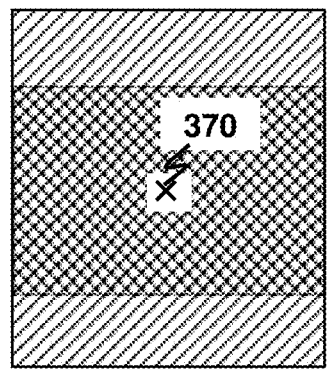
FIG. 3C illustrates, by an example, forming a second bounding rectangle by expanding a first bounding rectangle vertically with a center thereof as an anchor.

As shown in FIG. 3C, the first bounding rectangle 310 is expanded vertically with the center 370 as an anchor 332 of geometric operation, forming a second bounding rectangle 322.

Figure 3D:
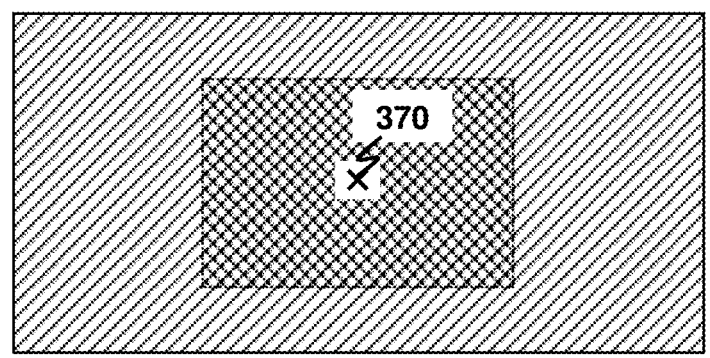
FIG. 3D illustrates, by an example, forming a second bounding rectangle by expanding a first bounding rectangle both horizontally and vertically with a center thereof as an anchor.

As shown in FIG. 3D, the first bounding rectangle 310 is expanded both horizontally and vertically with the center 370 as an anchor 333 of geometric operation, forming a second bounding rectangle 323.

Figure 3E:
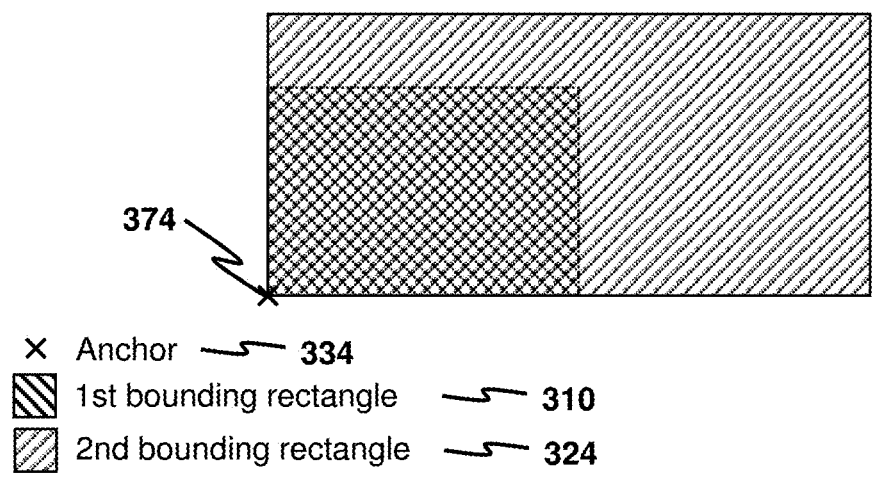
FIG. 3E illustrates, by an example, forming a second bounding rectangle by expanding a first bounding rectangle with a vertex thereof as an anchor.

As shown in FIG. 3E, the first bounding rectangle 310 is expanded with the vertex 374 as an anchor 334 of geometric operation, forming a second bounding rectangle 324. Any of the other three vertices 371-373 may also be the anchor 334.

Figure 3F:
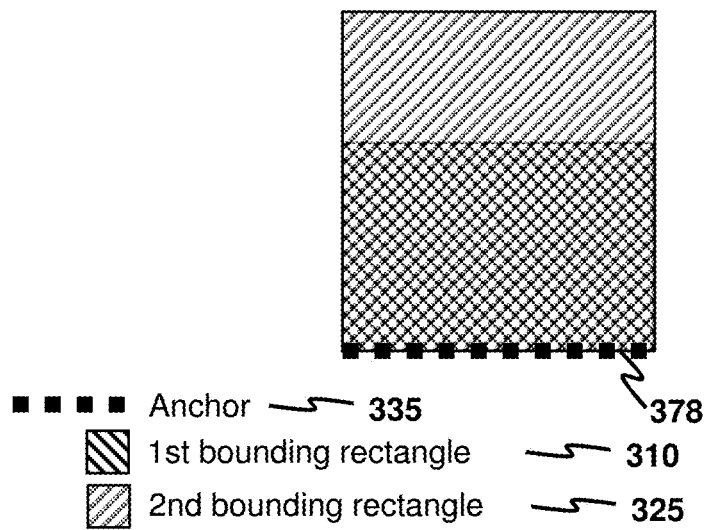
FIG. 3F illustrates, by an example, forming a second bounding rectangle by expanding a first bounding rectangle with a side thereof as an anchor.

As shown in FIG. 3F, the first bounding rectangle 310 is expanded with the side 378 as an anchor 335 of geometric operation, forming a second bounding rectangle 325. Any of the other three sides 376, 377 and 379 may also be the anchor 335.

Note that the rectangular bounding shape mentioned above is used as one example for illustration only. Other bounding shapes may be used instead of the rectangular bounding shape. For example, a circular bounding shape may be used. The circular bounding shape, i.e. a circle, can be expanded by using, e.g., the centre of the circle or a point on the circumference of the circle, as an anchor.

Figure 4:
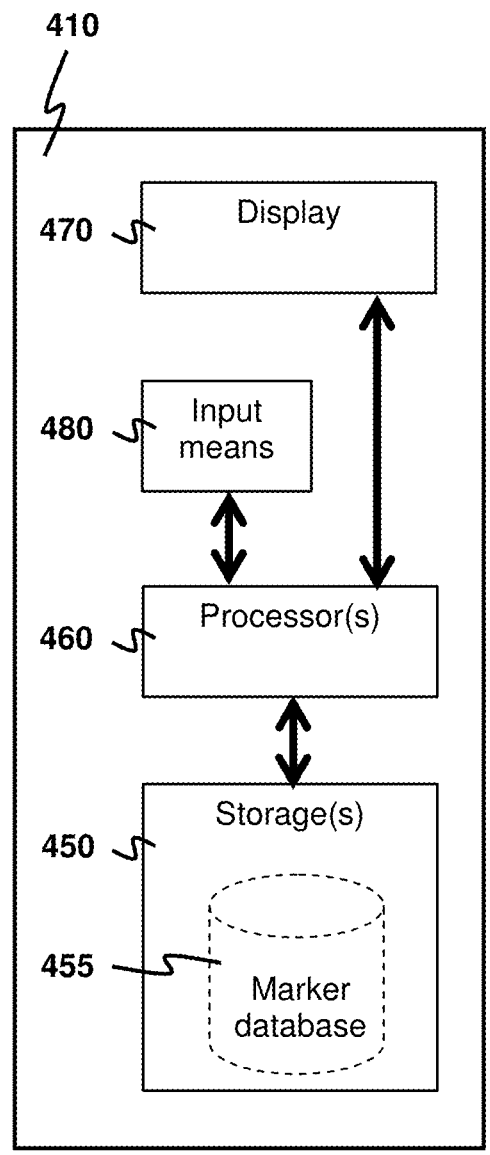
FIG. 4 depicts a mobile computing device used for implementing an AR client application and an AR contention creation system in accordance with one embodiment of the present invention.

In one practical scenario, an AR content creation system using one of the embodiments of the method disclosed above is implemented in a standalone mobile computing device. The mobile computing device also acts as a user interface for communicating with the user. The mobile computing device is also used for an AR client application. FIG. 4 depicts an example of the mobile computing device for implementing the AR content creation system. A mobile computing device 410 comprises a display 470 for displaying information sent from an AR client application, an input means 480 for receiving inputs from a user (input can be received via a touch sensor, a keypad, or some other means such as voice), one or more storages 450 for installing a marker database 455, and one or more processors 460 for performing the steps 110, 114, 116 and the search process 180 and for instructing the display 470 to display the advice in the step 140.

In another practical scenario, an AR content creation system adopting an embodiment of the method disclosed above is implemented by including a user device, a marker database, and a computing server communicable with the user device and the marker database, where the marker database and the computing server are remotely located from the user device. The user device may be a desktop computer connected to the computing server through a wired connection, or may be a mobile computing device wirelessly communicating with the computing server.

Figure 5:
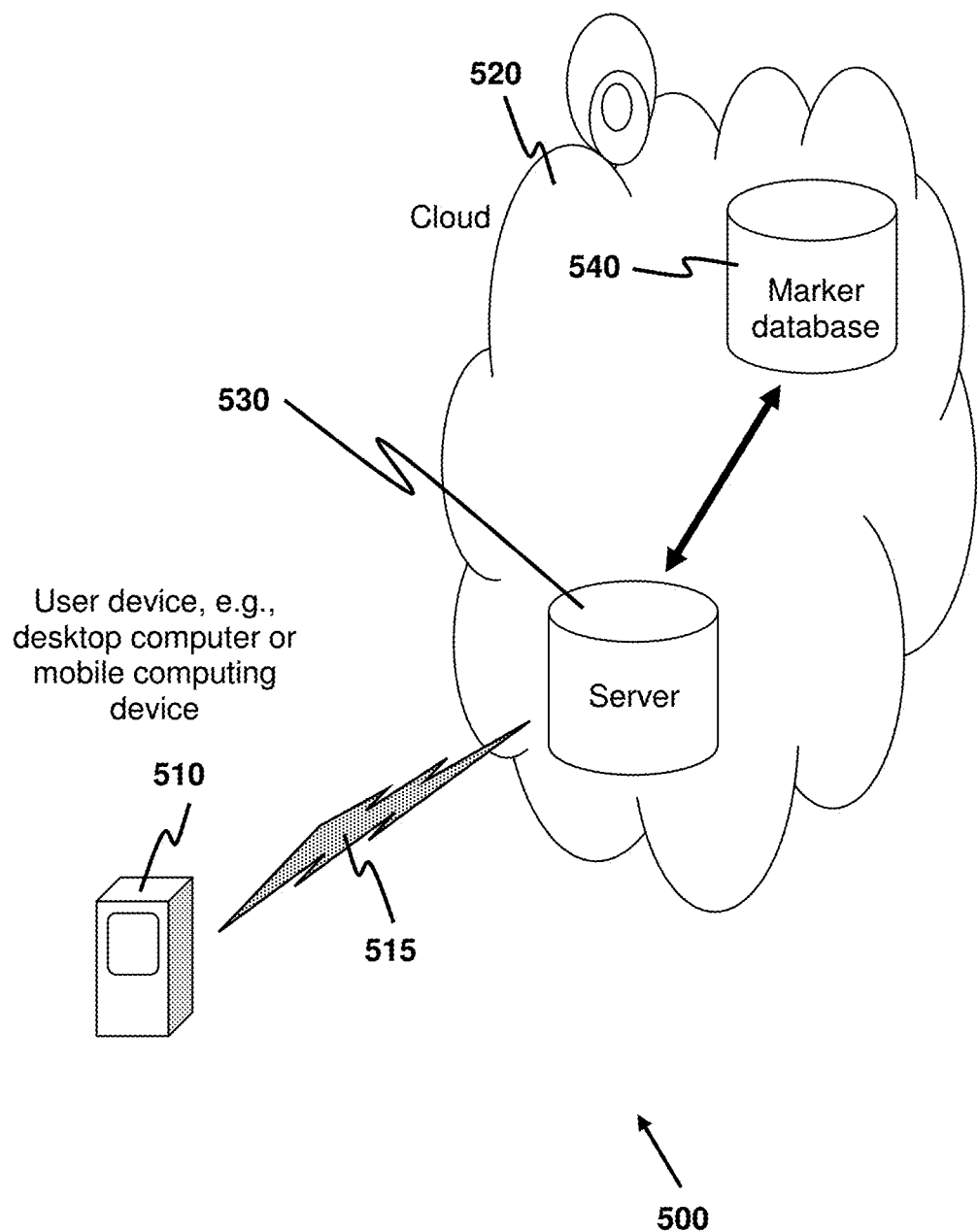
FIG. 5 depicts, in accordance with one embodiment of the present invention, an AR content creation system comprising a user device, a marker database located in a computing cloud, and a computing server located in the computing cloud and communicable with the user device and the marker database.

FIG. 5 depicts yet another practical implementation of an AR content creation system configured to execute a process according to an embodiment of the method disclosed above. An AR content creation system 500 comprises a user device 510, a marker database 540, and a computing server 530 communicable with the user device 510 and the marker database 540.

The user device 510 is connected to the computing server 530 via a communication link 515. In one option, the user device 510 is a desktop computer. In another option, the user device 510 is a mobile computing device such that the communication link 515 is a wireless link. In both options, it is not desirable to overload the communication link 515. As will soon be evidenced, the AR content creation system depicted in FIG. 5 is configured to avoid this overloading problem.

The computing server 530 and the marker database 540 are located in a computing cloud 520. A local copy of the image is stored in the computing server 530. When the user selects the first sub-image of the image and, through the user device 510, requests the AR content creation system 500 to use the first sub-image as the new marker, coordinates of the first sub-image on the image are sent from the user device 510 to the computing server 530 via the communication link 515 without a need to send the first sub-image thereto. The computing server 530 then creates a local copy of the first sub-image based on the received coordinates and the local copy of the image. It follows that communication burden on the communication link 515 due to transmitting the first sub-image to the computing server 530 is avoided. It is especially advantageous when it is required to frequently input a large number of first sub-images to AR content creation system 500 for assessing suitability of these first sub-images. The computing of the suitability score of any test image and the executing of the search process 180 to search for the second sub-image are performed by the computing server 530. After the second sub-image is determined at the computing server 530, coordinates of the second sub-image are transmitted to the user device 510. The user device 510 is then able to reconstruct a local copy of the second sub-image, thereby avoiding another communication burden on the communication link 515 due to transmitting the second sub-image to the user device 510.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. In an augmented reality (AR) content creation system comprising a marker database for storing markers and a user device at least functioning as an interface for communicating between the AR content creation system and a user, a method for updating the marker database with a new marker when the user selects a first sub-image of an image and requests the AR content creation system through the user device to use the first sub-image as the new marker the method comprising:
   computing, by one or more processors in the AR content creation system, a suitability score of the first sub-image, the suitability score of any test image being used for rating feature richness of the test image and uniqueness of the test image against existing markers already stored in the marker database such that a first test image having a value of the suitability score higher than a second test image's is more suitable than the second test image to be the new marker, wherein a greater number of feature points in the test image or a higher degree of difference between the test image and the existing markers gives a higher suitability score;
   when the suitability score of the first sub-image is less than a pre-determined threshold value, executing, by the one or more processors, a search process to search for a second sub-image of the image under a constraint that the second sub-image has a value of the suitability score not less than the pre-determined threshold value and completely contains the first sub-image, wherein the second sub-image is formed by adding a portion of the image neighboring the first sub-image to the first sub-image; and
   substantially-immediately after the second sub-image is found in the search process, presenting, by the user device, the second sub-image, the suitability score thereof and the suitability score of the first sub-image to the user to real-time suggest the user to use the second sub-image instead of the first sub-image as the new marker in updating the marker database so as to increase feature richness or uniqueness of the new marker, whereby an increase in feature richness of the new marker reduces both a chance of miss and a chance of false detection in executing an image recognition process in an AR client application, and whereby an increase in uniqueness of the new marker enables the AR client application to be less confused in image recognition of the new marker.

2. The method of claim 1, wherein the suitability score of any test image is computed by the one or more processors with a computing process comprising:
   identifying the feature points of the test image;
   generating a signature of the test image according to the feature points;
   determining a feature-richness score, $S_{FR}$, for rating feature richness of the test image, wherein the feature-richness score is determined according to the number of the feature points;
   determining a uniqueness score, $S_{UNI}$, for rating uniqueness of the test image against the existing markers already stored in the marker database, wherein the uniqueness score is determined by comparing the signature of the test image with signatures of the existing markers; and
   computing the suitability score, $S_{SUT}$, by $S_{SUT}=f(S_{FR},\alpha)\times f(S_{UNI},\beta)$ where $\alpha$ and $\beta$, both positive numbers, are weighting factors for $S_{FR}$ and $S_{UNI}$, respectively, and $f(S, c)$ is a monotonic increasing function of S.

3. The method of claim 1, wherein the search process comprises:
   based on a first boundary enclosing a first portion of the image where the first portion is used as the first sub-image, generating a candidate sub-image for consideration to be the second sub-image by outwardly expanding the first boundary to give a second boundary and forming the candidate sub-image as a second portion of the image enclosed by the second boundary, wherein the first boundary is of any shape; and
   repeating the generating of the candidate sub-image until:
   (a) the candidate sub-image lastly generated has a value of the suitability score not less than the pre-determined threshold value, whereby the lastly-generated candidate sub-image becomes the second sub-image; or
   (b) a pre-determined number of candidate sub-images have been generated but none of the candidate sub-images generated has a value of the suitability score not less than the pre-determined threshold value, so that the second sub-image is not found.

4. The method of claim 3, wherein:
   the first boundary has a first bounding rectangle that bounds the first boundary on the image, the first bounding rectangle having four vertices, four sides and a center;
   expanding the first bounding rectangle into a second bounding rectangle that contains the first bounding rectangle gives a proportional expansion to the first boundary, the first boundary after the proportional expansion giving the second boundary;
   the first boundary is outwardly expanded to give the second boundary through one of the following geometric operations:
   (a) expanding the first bounding rectangle horizontally, or vertically, or both, with the center as an anchor of geometric operation;
   (b) expanding the first bounding rectangle with one of the four vertices as an anchor of geometric operation; and
   (c) expanding the first bounding rectangle with one of the four sides as an anchor of geometric operation.

5. The method of claim 1 further comprising:
   when it is determined that the second sub-image is not found, presenting, by the user device, one candidate sub-image having a highest suitability score among the candidate sub-images that have been generated to the user.

6. The method of claim 1 further comprising:
   when the suitability score of the first sub-image is determined to be not less than the pre-determined threshold value, updating, by the one or more processors, the marker database with the first sub-image as the new marker.

7. An augmented reality (AR) content creation system comprising:
   a marker database for storing markers; and
   a user device comprising one or more processors, the user device at least functioning as an interface for communicating between the AR content creation system and a user;
   wherein the AR content creation system is configured to execute a process for updating the marker database with a new marker when the user selects a first sub-image of an image and requests the AR content creation system through the user device to use the first sub-image as the new marker, and wherein the marker database-updating process is arranged according to the method of claim 1.

8. The AR content creation system of claim 7, wherein:
the user device is a mobile computing device;
the marker database is installed in the mobile computing device; and
the computing of the suitability score of any test image and the executing of the search process to search for the second sub-image are performed locally at the mobile computing device.

9. An augmented reality (AR) content creation system comprising:
a marker database for storing markers; and
a user device comprising one or more processors, the user device at least functioning as an interface for communicating between the AR content creation system and a user;
wherein the AR content creation system is configured to execute a process for updating the marker database with a new marker when the user selects a first sub-image of an image and requests the AR content creation system through the user device to use the first sub-image as the new marker, and wherein the marker database-updating process is arranged according to the method of claim 2.

10. An augmented reality (AR) content creation system comprising:
a marker database for storing markers; and
a user device comprising one or more processors, the user device at least functioning as an interface for communicating between the AR content creation system and a user;
wherein the AR content creation system is configured to execute a process for updating the marker database with a new marker when the user selects a first sub-image of an image and requests the AR content creation system through the user device to use the first sub-image as the new marker, and wherein the marker database-updating process is arranged according to the method of claim 3.

11. An augmented reality (AR) content creation system comprising:
a marker database for storing markers; and
a user device comprising one or more processors, the user device at least functioning as an interface for communicating between the AR content creation system and a user;
wherein the AR content creation system is configured to execute a process for updating the marker database with a new marker when the user selects a first sub-image of an image and requests the AR content creation system through the user device to use the first sub-image as the new marker, and wherein the marker database-updating process is arranged according to the method of claim 4.

12. An augmented reality (AR) content creation system comprising:
a marker database for storing markers; and
a user device comprising one or more processors, the user device at least functioning as an interface for communicating between the AR content creation system and a user;
wherein the AR content creation system is configured to execute a process for updating the marker database with a new marker when the user selects a first sub-image of an image and requests the AR content creation system through the user device to use the first sub-image as the new marker, and wherein the marker database-updating process is arranged according to the method of claim 5.

13. An augmented reality (AR) content creation system comprising:
a marker database for storing markers; and
a user device comprising one or more processors, the user device at least functioning as an interface for communicating between the AR content creation system and a user;
wherein the AR content creation system is configured to execute a process for updating the marker database with a new marker when the user selects a first sub-image of an image and requests the AR content creation system through the user device to use the first sub-image as the new marker, and wherein the marker database-updating process is arranged according to the method of claim 6.

14. An augmented reality (AR) content creation system for minimizing a communication burden between a user device and a marker database, the AR content creation system comprising:
the user device at least functioning as an interface for communicating between the AR content creation system and a user;
the marker database for storing markers, the marker database being located in a computing cloud; and
a computing server communicable with the user device and the marker database, the computing server comprising one or more processors and being located in the computing cloud;
wherein:
the AR content creation system is configured to execute a process for updating the marker database with a new marker when the user selects a first sub-image of an image and requests the AR content creation system through the user device to use the first sub-image as the new marker;
the marker database-updating process is arranged according to the method of claim 1;
a local copy of the image is stored in the computing server;
the user device is configured such that when the user selects the first sub-image of the image and requests the AR content creation system to use the first sub-image as the new marker, coordinates of the first sub-image on the image are sent to the computing server without sending the first sub-image thereto, thereby allowing the computing server to have a knowledge of the first sub-image based on the local copy of the image while communication burden due to transmitting the first sub-image to the computing server is avoided;
the computing of the suitability score of any test image and the executing of the search process to search for the second sub-image are performed by the computing server; and
the computing server is further configured to transmit coordinates of the second sub-image to the user device without sending the second sub-image thereto, thereby allowing the user device to acquire the second sub-image while avoiding communication burden due to transmitting the second sub-image to the user device.

15. The AR content creation system of claim 14, wherein the user device is a mobile computing device configured to wirelessly communicate with the computing server.

16. An augmented reality (AR) content creation system for minimizing a communication burden between a user device and a marker database, the AR content creation system comprising:

the user device at least functioning as an interface for communicating between the AR content creation system and a user;
the marker database for storing markers, the marker database being located in a computing cloud; and
a computing server communicable with the user device and the marker database, the computing server comprising one or more processors and being located in the computing cloud;
wherein:
the AR content creation system is configured to execute a process for updating the marker database with a new marker when the user selects a first sub-image of an image and requests the AR content creation system through the user device to use the first sub-image as the new marker;
the marker database-updating process is arranged according to the method of claim 2;
a local copy of the image is stored in the computing server;
the user device is configured such that when the user selects the first sub-image of the image and requests the AR content creation system to use the first sub-image as the new marker, coordinates of the first sub-image on the image are sent to the computing server without sending the first sub-image thereto, thereby allowing the computing server to have a knowledge of the first sub-image based on the local copy of the image while communication burden due to transmitting the first sub-image to the computing server is avoided;
the computing of the suitability score of any test image and the executing of the search process to search for the second sub-image are performed by the computing server; and
the computing server is further configured to transmit coordinates of the second sub-image to the user device without sending the second sub-image thereto, thereby allowing the user device to acquire the second sub-image while avoiding communication burden due to transmitting the second sub-image to the user device.

17. An augmented reality (AR) content creation system for minimizing a communication burden between a user device and a marker database, the AR content creation system comprising:
the user device at least functioning as an interface for communicating between the AR content creation system and a user;
the marker database for storing markers, the marker database being located in a computing cloud; and
a computing server communicable with the user device and the marker database, the computing server comprising one or more processors and being located in the computing cloud;
wherein:
the AR content creation system is configured to execute a process for updating the marker database with a new marker when the user selects a first sub-image of an image and requests the AR content creation system through the user device to use the first sub-image as the new marker;
the marker database-updating process is arranged according to the method of claim 3;
a local copy of the image is stored in the computing server;
the user device is configured such that when the user selects the first sub-image of the image and requests the AR content creation system to use the first sub-image as the new marker, coordinates of the first sub-image on the image are sent to the computing server without sending the first sub-image thereto, thereby allowing the computing server to have a knowledge of the first sub-image based on the local copy of the image while communication burden due to transmitting the first sub-image to the computing server is avoided;
the computing of the suitability score of any test image and the executing of the search process to search for the second sub-image are performed by the computing server; and
the computing server is further configured to transmit coordinates of the second sub-image to the user device without sending the second sub-image thereto, thereby allowing the user device to acquire the second sub-image while avoiding communication burden due to transmitting the second sub-image to the user device.

18. An augmented reality (AR) content creation system for minimizing a communication burden between a user device and a marker database, the AR content creation system comprising:
the user device at least functioning as an interface for communicating between the AR content creation system and a user;
the marker database for storing markers, the marker database being located in a computing cloud; and
a computing server communicable with the user device and the marker database, the computing server comprising one or more processors and being located in the computing cloud;
wherein:
the AR content creation system is configured to execute a process for updating the marker database with a new marker when the user selects a first sub-image of an image and requests the AR content creation system through the user device to use the first sub-image as the new marker;
the marker database-updating process is arranged according to the method of claim 4;
a local copy of the image is stored in the computing server;
the user device is configured such that when the user selects the first sub-image of the image and requests the AR content creation system to use the first sub-image as the new marker, coordinates of the first sub-image on the image are sent to the computing server without sending the first sub-image thereto, thereby allowing the computing server to have a knowledge of the first sub-image based on the local copy of the image while communication burden due to transmitting the first sub-image to the computing server is avoided;
the computing of the suitability score of any test image and the executing of the search process to search for the second sub-image are performed by the computing server; and
the computing server is further configured to transmit coordinates of the second sub-image to the user device without sending the second sub-image thereto, thereby allowing the user device to acquire the second sub-image while avoiding communication burden due to transmitting the second sub-image to the user device.

19. An augmented reality (AR) content creation system for minimizing a communication burden between a user device and a marker database, the AR content creation system comprising:

the user device at least functioning as an interface for communicating between the AR content creation system and a user;

the marker database for storing markers, the marker database being located in a computing cloud; and a computing server communicable with the user device and the marker database, the computing server comprising one or more processors and being located in the computing cloud;

wherein:

the AR content creation system is configured to execute a process for updating the marker database with a new marker when the user selects a first sub-image of an image and requests the AR content creation system through the user device to use the first sub-image as the new marker;

the marker database-updating process is arranged according to the method of claim 5;

a local copy of the image is stored in the computing server;

the user device is configured such that when the user selects the first sub-image of the image and requests the AR content creation system to use the first sub-image as the new marker, coordinates of the first sub-image on the image are sent to the computing server without sending the first sub-image thereto, thereby allowing the computing server to have a knowledge of the first sub-image based on the local copy of the image while communication burden due to transmitting the first sub-image to the computing server is avoided;

the computing of the suitability score of any test image and the executing of the search process to search for the second sub-image are performed by the computing server; and the computing server is further configured to transmit coordinates of the second sub-image to the user device without sending the second sub-image thereto, thereby allowing the user device to acquire the second sub-image while avoiding communication burden due to transmitting the second sub-image to the user device.

20. An augmented reality (AR) content creation system for minimizing a communication burden between a user device and a marker database, the AR content creation system comprising:

the user device at least functioning as an interface for communicating between the AR content creation system and a user;

the marker database for storing markers, the marker database being located in a computing cloud; and a computing server communicable with the user device and the marker database, the computing server comprising one or more processors and being located in the computing cloud;

wherein:

the AR content creation system is configured to execute a process for updating the marker database with a new marker when the user selects a first sub-image of an image and requests the AR content creation system through the user device to use the first sub-image as the new marker;

the marker database-updating process is arranged according to the method of claim 6;

a local copy of the image is stored in the computing server;

the user device is configured such that when the user selects the first sub-image of the image and requests the AR content creation system to use the first sub-image as the new marker, coordinates of the first sub-image on the image are sent to the computing server without sending the first sub-image thereto, thereby allowing the computing server to have a knowledge of the first sub-image based on the local copy of the image while communication burden due to transmitting the first sub-image to the computing server is avoided;

the computing of the suitability score of any test image and the executing of the search process to search for the second sub-image are performed by the computing server; and the computing server is further configured to transmit coordinates of the second sub-image to the user device without sending the second sub-image thereto, thereby allowing the user device to acquire the second sub-image while avoiding communication burden due to transmitting the second sub-image to the user device.

* * * * *